United States Patent
Howard, Jr. et al.

(10) Patent No.: US 9,386,827 B2
(45) Date of Patent: Jul. 12, 2016

(54) ARTICLE OF MOTION JEWELRY

(71) Applicants: Johnny Ray Howard, Jr., Cleveland, OH (US); Seyed Amin Ghorashi Sarvestani, Keppel Bay (SG)

(72) Inventors: Johnny Ray Howard, Jr., Cleveland, OH (US); Seyed Amin Ghorashi Sarvestani, Keppel Bay (SG)

(*) Notice: Subject to any disclaimer, the term of this patent is extended or adjusted under 35 U.S.C. 154(b) by 0 days.

(21) Appl. No.: 14/246,177

(22) Filed: Apr. 7, 2014

(65) Prior Publication Data
US 2015/0282572 A1    Oct. 8, 2015

(51) Int. Cl.
| | |
|---|---|
| *A44C 5/00* | (2006.01) |
| *A44C 5/02* | (2006.01) |
| *F16H 31/00* | (2006.01) |
| *A44C 9/00* | (2006.01) |
| *A44C 13/00* | (2006.01) |
| *A44C 5/10* | (2006.01) |
| *A44C 25/00* | (2006.01) |
| *A44C 15/00* | (2006.01) |

(52) U.S. Cl.
CPC . *A44C 5/02* (2013.01); *A44C 9/003* (2013.01); *A44C 13/00* (2013.01); *F16H 31/005* (2013.01); *A44C 5/0007* (2013.01); *A44C 5/10* (2013.01); *A44C 15/00* (2013.01); *A44C 25/00* (2013.01)

(58) Field of Classification Search
CPC ...... A44C 5/00; A44C 5/0007; A44C 5/0015; A44C 5/02; A44C 5/10; A44C 5/107; A44C 5/22; A44C 25/00
USPC ........... 40/446; 446/236; 63/4, 21, 24, 25, 33, 63/38; 318/685, 557
See application file for complete search history.

(56) References Cited

U.S. PATENT DOCUMENTS

| | | | | |
|---|---|---|---|---|
| 1,099,810 | A * | 6/1914 | Mehrlust | 59/79.3 |
| 3,610,488 | A * | 10/1971 | Tracy | 224/171 |
| 4,571,204 | A * | 2/1986 | Wang | 446/138 |
| 5,101,587 | A * | 4/1992 | Toraby-Payhan | 40/450 |
| 5,376,037 | A * | 12/1994 | Finkbeiner | 446/236 |
| 6,386,940 | B1 * | 5/2002 | Chang | 446/236 |
| 7,862,488 | B2 * | 1/2011 | Albanese | 482/110 |
| 2012/0090356 | A1 * | 4/2012 | Liberman et al. | 63/3 |

FOREIGN PATENT DOCUMENTS

| | | | | |
|---|---|---|---|---|
| EP | 6664 A1 * | 1/1980 | | F16G 13/00 |
| FR | 2577173 A1 * | 8/1986 | | A44C 13/00 |

OTHER PUBLICATIONS

Translation for Wuthrich.*
Tranlsation for Silbermann.*

* cited by examiner

*Primary Examiner* — Emily Morgan
(74) *Attorney, Agent, or Firm* — Emerson Thomson Bennett, LLC

(57) ABSTRACT

A movable jewelry device may include an article of jewelry having multiple connectable links containing ornamental surfaces and gear teeth. A motion apparatus may contain gear teeth that engage the gear teeth on the article of jewelry to move article of jewelry.

13 Claims, 2 Drawing Sheets

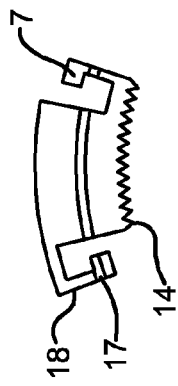
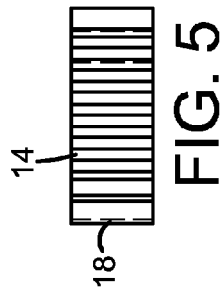
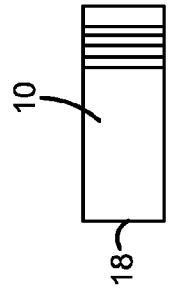
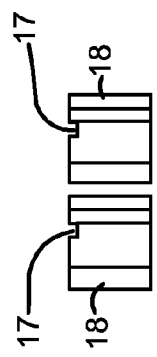
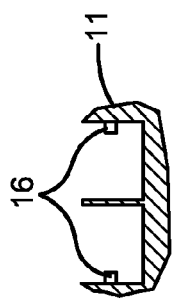
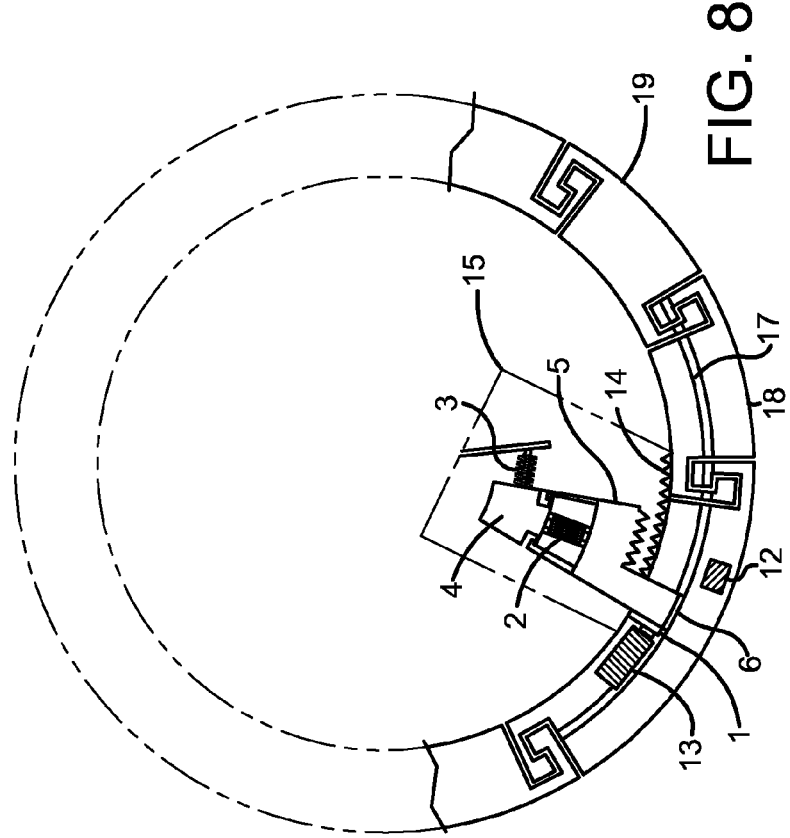
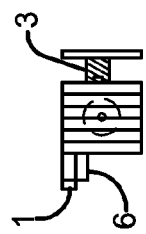
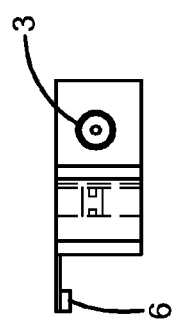

ARTICLE OF MOTION JEWELRY

TECHNICAL FIELD

Provided is an article of jewelry such as bracelets, necklaces, rings, etc. More specifically, provided is a jewelry item with the added function of being able to automatically rotate.

BACKGROUND

Pieces of jewelry are works of art limited only by the imagination and creativity of the artists themselves. Gemstones are inherently beautiful. For example, diamonds are beautiful and extremely valuable and are often incorporated into jewelry for the purpose or being worn and to display their beauty. When jewelry is offered for sale at a jewelry store, it is commonly presented in a manner that highlights its elegance and scintillating brilliance. This is accomplished through the use of bright lighting and open display to allow light to reach the piece from all angles. Often, jewelry is shown in a case upon a turntable or other rotating mechanism, an that potential buyers can view the jewelry from multiple angles and visually experience the way the light interacts with the piece.

Additionally, many pieces of jewelry have beautiful features that cannot be fully realized when worn. For example, a diamond ring may have diamonds all around its circumference, yet only the top of the ring may be seen by others when worn.

Pieces of jewelry with movement and modifiable parts have been long known, however these prior jewelry constructions fail to provide both movement and modification at the same time. They also do not provide programmable and controllable movement for rotation of the jewelry.

SUMMARY

According to one aspect of this invention, movable jewelry device may comprise: an article of jewelry comprising: (1) a plurality of selectively connectable links each comprising: (a) an ornamental surface; and, (b) jewelry gear teeth; and, (2) a it that holds the plurality of links together a motion apparatus comprising: (1) a movement magnet; (2) a return magnet; (3) a movement spring, (4) a return spring; and, (5) motion gear teeth; and, a control apparatus comprising: (1) a first electric actuator; (2) a second electric actuator; and, (3) a control switch. The plurality of links are may be movable with respect to the frame by manually activating the control switch: to: activate the first electric actuator to engage the movement magnet to: (1) engage the jewelry gear teeth with the motion gear teeth; and, (2) move the motion apparatus and thus the plurality of connectable links with respect to the frame; then: (1) deactivate the first electric actuator; and, (2) maintain the engagement of the jewelry gear teeth to the motion gear teeth using a force from the movement spring; there activate the second electric actuator to engage the return magnet to separate the jewelry gear teeth from the motion gear teeth; and, then: (1) deactivate the second electric actuator; and, (2) maintain the separation of the jewelry gear teeth from the motion gear teeth using a force from the return spring.

According to another aspect of this invention, as long as the control switch is manually activated the plurality of links continue to move with respect to the frame.

According to another aspect of this invention, each of the links comprises: (1) an inner surface upon which the jewelry gear teeth are positioned; (3) an outer surface upon which the ornamental surface is positioned; and, (4) first and second sides; the plurality of links form a ring shape; the frame is ring shaped; and, one to the plurality of links and the frame comprises a groove and the other of the plurality of links and the frame comprises a protrusion that is received within the groove to movably connect the frame to the plurality of links.

According to another aspect of this invention, each of the links has a first end with a first interlocking arm and a second end with a second interlocking arm; and, the first interlocking arm of a first link engages the second interlocking arm of a second link to attach the first link to the second link.

According to another aspect of this invention, each of the first interlocking arms extend relatively inward and each of the second interlocking arms extend relatively outward.

According to another aspect of this invention, the movable jewelry device may further comprise a compartment that: (1) is affixed to the frame; (2) houses the motion apparatus; and, (3) houses the control apparatus.

According to another aspect of this invention, the control apparatus comprises: (1) an electronic control board; (2) a recharging connector; and, (3) a battery; and, the compartment comprises across to the plurality of links whereby the plurality of inks can be replaced.

According to another aspect of this invention, the plurality of selectively connectable links together define one of: a bracelet; a necklace; and, a ring.

According to another aspect of this invention, the plurality of selectively connectable links together define a dual bracelet; and, the frame is W-shaped.

According to another aspect of this invention the control apparatus comprises an electronic control module that is user programmable to program the control apparatus to vary at least one of: (1) directions the plurality of inks are movable with respect to the frame; (2) speeds the plurality of links are movable with respect to the frame; and (3) durations the plurality of links are movable with respect to the frame.

According to another aspect of this invention, a method may comprise the steps of: (A) providing a movable jewelry device comprising: an article of jewelry comprising: (1) a plurality of selectively connectable links each comprising: (a) an ornamental surface; and, (b) jewelry gear teeth; and, (2) a frame that holds the plurality of links together; a motion apparatus comprising: (1) a movement magnet; (2) a return magnet; (3) a movement spring; (4) a return spring, and, (5) motion gear teeth; and, a control apparatus comprising: (1) a first electric actuator; (2) a second electric actuator; and, (3) a control switch; and, (B) moving the plurality of links with respect to the frame by manually activating the control switch: to: activate the first electric actuator to engage the movement magnet to: (1) engage the jewelry gear teeth with the motion gear teeth; and, (2) move the motion apparatus and thus the plurality of connectable links with respect to the frame; then: (1) deactivate the first electric actuator; and, (2) maintain the engagement of the jewelry gear teeth to the motion gear teeth using a force from the movement spring; then: activate the second electric actuator to engage the return magnet to separate the jewelry gear teeth from the motion gear teeth; and, then: (1) deactivate the second electric actuator; and, (2) maintain the separation of the jewelry gear teeth from the motion gear teeth using a force from the return spring.

According to another aspect of this invention, step (B) comprises the step of: continuing to move the plurality of links with respect to the frame as long as the control switch is manually activated.

According to another aspect of this invention, step (A) comprises the steps of: providing each of the links to comprise: (1) an inner surface upon which the jewelry gear teeth are positioned; (3) an outer surface upon which the ornamental surface is positioned; and, (4) first and second sides; providing the plurality of links to form a ring shape; providing the frame to be ring shaped; and providing one of the plurality of links and the frame to comprise a groove and the other of the plurality of links and the frame to comprise a protrusion that is received within the groove; and, step (B) comprises the step of: moving the protrusion with respect to the groove as the plurality of links is moved with respect to the frame.

According to another aspect of this invention, the step of: providing an article of jewelry comprising a plurality of selectively connectable links comprises the steps of providing each of the links to have a first end with a first interlocking arm and a second end with a second interlocking arm; and, engaging the first interlocking arm of each link to the second interlocking arm of a juxtaposed link.

According to another aspect of this invention, step (A) comprises the step of: providing a compartment attached to the frame; and, the method further comprises the step of: accessing the plurality of links through the compartment to replace at least one of the plurality of links.

According to another aspect of this invention, step (A) comprises the step of: providing the control apparatus with a programmable electronic control module; and, the method further comprises the step of: using the programmable electronic control module to vary directions that the plurality of links are movable with respect to the frame.

According to another aspect to this invention, step (A) comprises the step of providing the control apparatus with a programmable electronic control module; and, the method farther comprises the step of: using the programmable electronic control module to vary speeds the plurality of links are movable with respect to the frame.

According to another aspect of this invention, step (A) comprises the step of: providing the control apparatus with a programmable electronic control module; and, the method further comprises the step of: using the programmable electronic control module to vary durations the plurality of links are movable with respect to the frame.

BRIEF DESCRIPTION OF THE DRAWINGS

FIG. 4 is a diagram of the link top view;
FIG. 5 is a diagram of the link side view (teeth side)
FIG. 6 is a diagram of the link side view (connection side);
FIG. 7 is a diagram of the link end view;
FIG. 8 is a diagram of the motion apparatus enlarged in conjunction with the links;
FIG. 9 is a diagram of the motion apparatus front view;
FIG. 10 is a diagram of the motion apparatus side view; and,
FIG. 11 is a diagram of the frame inside view.

DESCRIPTION

Figure 1:
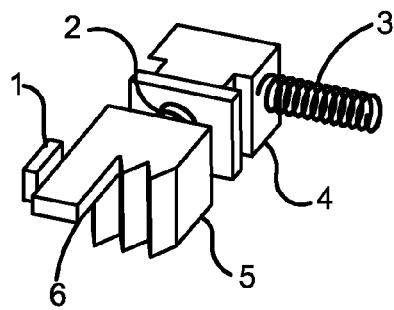
FIG. 1 is a diagram of the motion apparatus perspective.

A piece of jewelry such as bracelets, necklaces, rings, etc . . . is provided which is capable of both movement and modification while simultaneously being worn by a user. In an exemplary embodiment the article of motion jewelry is a bracelet which has a frame that has a substantially "W" shaped cross section (FIG. 11) and forms a ring. The "W" shaped frame 11 includes a first outer portion, a second outer portion, an inner portion, a base portion and two raised protrusions 16 which lit into the corresponding grooves 17 and function to hold the links 18 together, secure them to the frame 11 and keep them in the proper position in relation to the motion apparatus 4. The "W" shaped frame 11 holds two exemplary bracelets 19 with each bracelet made up of multiple links 18. Said links each have art ornamental surface 10, gear teeth 14, a guide groove 17, and two interlocking arms 7. The two interlocking arms 7 are arranged so that two or more links can be combined to form the bracelet 19 (FIG. 8 shows a side view of the interlocking arms 7 connected to each other as contemplated in this exemplary bracelet). These uniquely shaped interlocking arms 7 allow the links to be attached to each other without the need for mechanical attachment devices, such as a clasp or a pin, or through welding. This allows for the links to be exchanged should the wearer desire a different design or look of the article of motion jewelry. The links 18 themselves could be made of precious metals, steel, titanium, polymers, plastic, or other suitable materials which would be apparent to one skilled in the art. The gear teeth 14 on the bottom of the links 18 may form a complete gear when attached to a sufficient number of additional links to form a complete ring. The links 18 and the associated gear teeth 14 may serve as a "pinion" type gear with the motion apparatus 4 and movement gear 5 functioning substantially as the "rack."

Another embodiment of the article of motion jewelry may be a ring capable of being worn on any finger or thumb.

Yet another embodiment of the article of motion jewelry may be a necklace whose design may be limited only by the imagination and skill of the artist.

FIG. 1 shows an exemplary motion apparatus 4 which includes the movement magnet 1, the movement spring 2, the return spring 3, the movement gear 5, and the return magnet 6. In one embodiment of the motion apparatus 4 the body of the motion apparatus is made out of polycarbonate polymer which is both light weight and durable. In one embodiment, the motion apparatus 4 and movement gear 5 are both made of polycarbonate polymer.

In an exemplary embodiment, the motion apparatus 4 is functional to move the jewelry piece in any direction. This movement is accomplished through the following procedure:

A) The wearer activates the movement control switch 9; thereby causing a first electric actuator 13 to engage the movement magnet 1 by generating an identical magnetic pole on the movement magnet 1 which may force the movement gear 5 forward. The engagement of the movement gear 5 effectuates the rotation of the jewelry. The movement gear 5 is held in contact with the gear teeth 14 by the movement spring 2 allowing the first electric actuator 13 to be deactivated.

B) Upon completion of the movement step, a second electric actuator 12 is activated which creates an identical magnetic pole on the return magnet 6 which engages the return magnet 6 to bring the movement gear back 5 back to its original position away from the links 18 where it is held in place by the return spring 3, thus allowing the second electric actuator 12 to be deactivated.

The repetition of this process may allow for continuous movement of the jewelry piece within its frame. In an exemplary embodiment of the jewelry piece, controlling the first actuator 13 and second actuator 12 is accomplished through the employment of a programmable electronic control board and microcontroller which controls the speed and duration of the rotation. The electronic control board is capable of being programmed with various movement styles based on the wearer's preference. Such movement style programming may be downloaded by the wearer from the internet and specific to the type and style of the particular piece of jewelry. In one embodiment, the downloaded control programs may include continuous motion. Another embodiment might include timed motion, moving the piece at a specific interval set by the user. Yet another embodiment may be custom movement where the piece only moves when the user activates the program. Other program options would be apparent to one skilled in the art.

Figure 2:
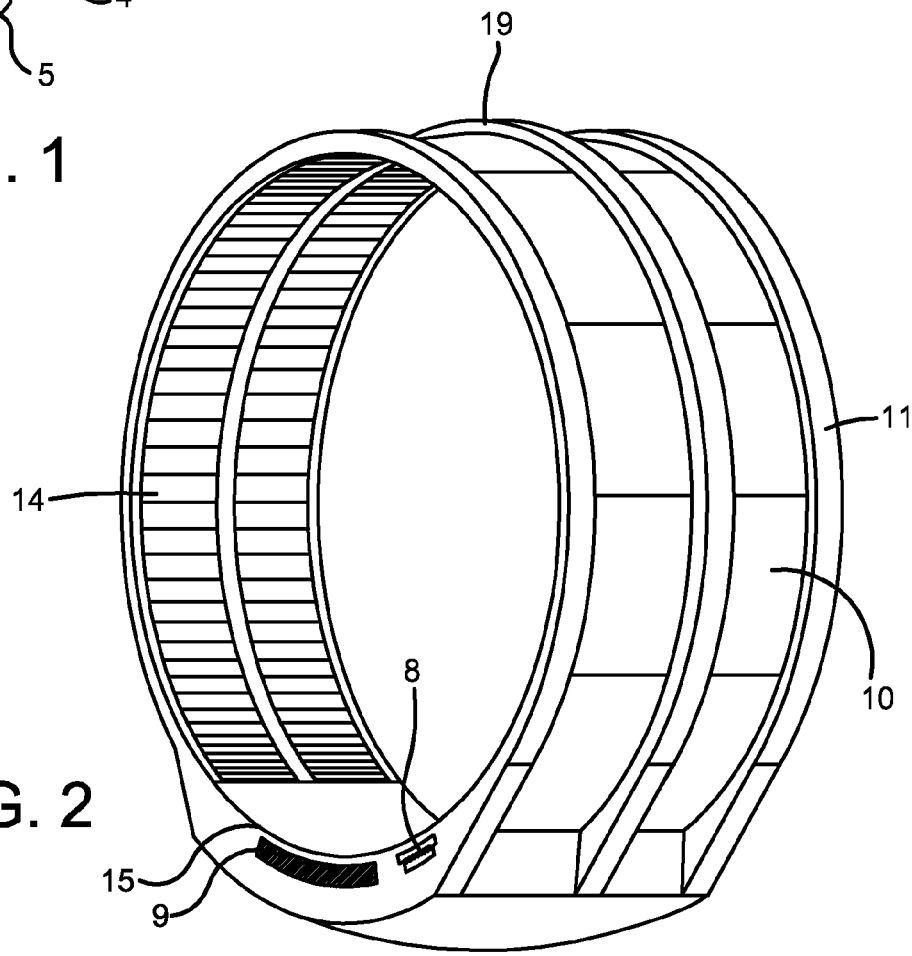
FIG. 2 is a diagram of an exemplary article of motion jewelry.

FIG. 2 shows an exemplary example of the dual bracelet 19 with the "W" shaped frame 11 base portions removed, revealing the gear teeth 14 on the bottom side of the links 18. An accessible compartment 15 is affixed to the "W" shaped frame 11 and houses the motion apparatus 4 along with the electronic control board, the data and recharging connector 8, movement control switch 9, a battery, and access point for replacing the links 18. The links 18 are shown in the dual bracelet 19 embodiment as a complete ring having an ornamental surface 10 facing outward. This ornamental surface 10 may be adorned with gemstones, engravings, or any other ornamental design as desired by the wearer. The chosen design is limited only by an artist's imagination.

Figure 3:
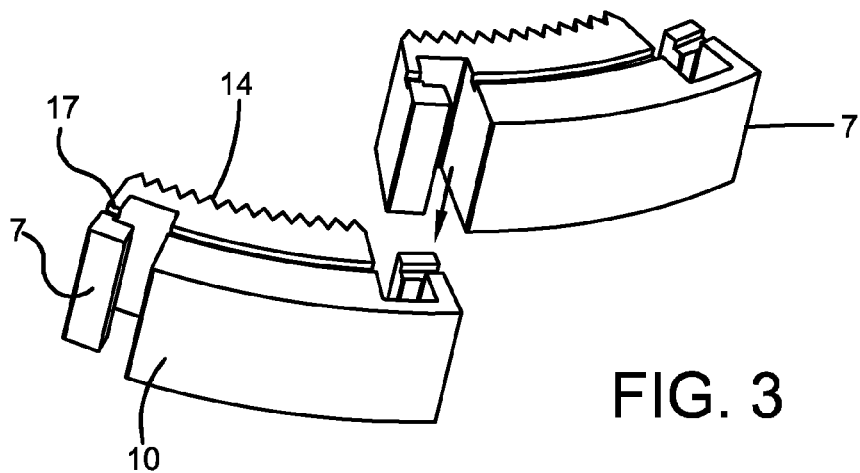
FIG. 3 is a diagram of the link perspective.

FIG. 3 shows a perspective of an individual link 18 as depicted in the exemplary bracelet embodiment 19. The link 18 is shown having an ornamental surface 10, gear teeth 14, the guide groove 17, and the interlocking arms 7.

FIG. 4 is a top view of an exemplary embodiment link 18 showing the groove 17, gear teeth 14, and interlocking arms 7 in more detail.

FIG. 5 is a side view of an exemplary embodiment link 18 showing the gear teeth 14.

FIG. 6 is a side view of the ornamental surface 10 of an exemplary embodiment link 18.

FIG. 7 is an end view of an exemplary embodiment link 18 showing the groove 17.

FIG. 8 shows an enlarged view of the movement apparatus 4 in relation to the exemplary bracelet 19 which is depicted as a semi-circle which may be comprised of multiple links 18. Shown in an exemplary embodiment, the movement apparatus is oriented against the "W" shaped frame 11 with the first movement actuator 13, movement magnet 1, second movement actuator 12, and return magnet 6 positioned alongside the links 18. The movement gear 5 is aligned with the gear teeth 14 of the links 18. The movement spring 2 and return spring 3 are shown within the body of the motion apparatus 4, which is contained in the accessible compartment 15.

FIG. 9 shows the motion apparatus 4 viewed from the front, looking, at the movement gear 5. Interior and behind the movement gear 5 is the movement spring 2. Also shown are the proper orientation of the movement magnet 1, return magnet 6, and the return spring 3.

FIG. 10 shows a side view of the motion apparatus 4 with the return magnet 6, movement gear 5, movement spring 2, and return spring 3.

FIG. 11 is a cross sectional view to the "W" shaped frame 11 showing the protrusions 16 that secure the links 18 within the shaped frame 11 via the groove 17.

While the article of motion jewelry has been described in connection with various illustrative embodiments, it is to be understood that other similar embodiments may be used or modifications and additions may be made to the described embodiments for performing the marine function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the article of motion jewelry should not be limited to any single embodiment, but rather construed in breadth and scope in accordance with the recitations of the appended claims.

We claim:

1. A movable jewelry device comprising:
   an article of jewelry having
      at least one plurality of selectively connectable links, wherein each link has
         an ornamental surface, and
         jewelry gear teeth opposite said ornamental surface, and
      a substantially circular frame
         slidably engaged with each link, and wherein each plurality of selectively connectable links forms a complete gear, and
         wherein each gear is held in a circle concentric with, and rotatable with respect to, the circular frame,
   a motion apparatus having,
      a movement gear adapted to engage and move at least one plurality of selectively connectable links, and
      a movement magnet engaged with the movement gear and adapted to move said movement gear when acted on by a repelling magnetic force; and
      a first electric actuator adapted to create an acting repelling magnetic force on the movement magnet.

2. The movable jewelry device of claim 1, wherein each of the links has an elongated groove,
   the frame includes a raised protrusion, the elongated groove is adapted to slidably engage the raised protrusion.

3. The movable jewelry device of claim 2, wherein the article of jewelry comprises two pluralities of selectively connectable links.

4. The movable jewelry device of claim 3, wherein the frame has a substantially W-shaped cross-section.

5. The movable jewelry device of claim 4, wherein the frame has two raised protrusions which are adapted to slidably engage the corresponding grooves on each of the links.

6. A movable jewelry device comprising:
   an article of jewelry having
      at least one plurality of selectively connectable links, wherein each link has
         an ornamental surface, and
         jewelry gear teeth opposite said ornamental surface, and
      a substantially circular frame
         slidably engaged with each link, and wherein each plurality of selectively connectable links forms a complete gear, and
         wherein each gear is held in a circle concentric with, and rotatable with respect to, the circular frame,
   a motion apparatus having,
      a movement gear having gear teeth, the movement gear,
         being selectably and operatively engageable with respect to the jewelry gear teeth of at least one plurality of selectively connectable links, and
         being adapted to, when engaged with the jewelry gear teeth of at least one plurality of selectively connectable links, and moved with respect to the frame, move at least one plurality of selectively connectable links, and
      a movement magnet engaged with the movement gear and adapted to move said movement gear when acted on by a repelling magnetic force; and
      a first electric actuator adapted to create an acting repelling magnetic force on the movement magnet;

wherein, when the movement gear is operatively engaged with the jewelry gear teeth of at least one plurality of selectively connectable links, and moved by the movement magnet the plurality of selectively connectable links rotates with respect to the frame.

7. The movable jewelry device of claim 6, wherein each of the links has an elongated groove,
the frame includes a raised protrusion,
the elongated groove is adapted to slidably engage the raised protrusion.

8. The movable jewelry device of claim 7, wherein the article of jewelry comprises at least two pluralities of selectively connectable links.

9. The movable jewelry device of claim 8, wherein the frame has a substantially W-shaped cross-section.

10. The movable jewelry device of claim 9, wherein the frame has two raised protrusions which are adapted to slidably engage the corresponding grooves on each of the links.

11. The movable jewelry device of claim 6, wherein the motion apparatus further has a movement spring adapted to provide a force to maintain engagement between the movement gear and the jewelry gear teeth of at least one plurality of selectively connectable links.

12. The movable jewelry device of claim 11, wherein the motion apparatus further has
a return magnet engaged with the movement gear and adapted to disengage said movement gear when acted on by a repelling magnetic force; and
the control apparatus further comprising a second electric actuator adapted to create acting repelling magnetic force on the return magnet.

13. A method of activating a movable jewelry device comprising:
providing a movable jewelry device, the movable jewelry device having
an article of jewelry having
at least one plurality of selectively connectable links, wherein each link has
an ornamental surface, and
jewelry gear teeth opposite said ornamental surface, and
a substantially circular frame
slidably engaged with each link, and wherein each plurality of selectively connectable links forms a complete gear, and
wherein each gear is held in a circle concentric with, and rotatable with respect to, the circular frame,
a motion apparatus having
a movement gear adapted to engage and move at least one plurality of selectively connectable links, and
a movement magnet engaged with the movement gear and adapted to move said movement gear when acted on by a repelling magnetic force; and
a first electric actuator adapted to create an acting repelling magnetic force on the movement magnet; and
moving at least one plurality of selectively connectable links with respect to the frame by
using the first electric actuator to create an acting repelling magnetic force on the movement magnet,
moving the movement gear with the movement magnet,
engaging the movement gear with at least one plurality of selectively connectable links,
moving at least one plurality of selectively connectable links with the movement gear.

* * * * *